United States Patent [19]

Levacher et al.

[11] 3,771,069

[45] Nov. 6, 1973

[54] COUPLING UNIT TO COUPLE CARRIER FREQUENCIES FROM HIGH VOLTAGE TRANSMISSION LINES

[75] Inventors: Friedrich Levacher, Brauweiler; Karl Dornseifer; Karl-Heinz Nolting, both of Cologne; Helmut Frielingsdorf, Bergisch-Gladbach; Hans-Joachim Kirch, Cologne, all of Germany

[73] Assignee: Felten & Guilleaume Kabelwerke Aktiengesellschaft, Cologne, Germany

[22] Filed: May 26, 1972

[21] Appl. No.: 257,328

[30] Foreign Application Priority Data

June 1, 1971 Germany .................. P 21 27 193.2

[52] U.S. Cl. ...................... 333/24 C, 333/8, 333/32

[51] Int. Cl. ............................................ H03h 7/00

[58] Field of Search .................... 333/8, 24 R, 24 C, 333/32

[56] References Cited

UNITED STATES PATENTS

| | | | |
|---|---|---|---|
| 2,036,381 | 4/1936 | Zinn | 333/32 |
| 2,997,672 | 8/1961 | Reinsmith | 333/24 R |

*Primary Examiner*—Paul L. Gensler
*Attorney*—Michael S. Striker

[57] ABSTRACT

An elongated, oil-filled isolating body has two metal caps. Each metal cap encloses one end of the elongated oil-filled body. An auto-transformer is enclosed inside each metal cap, the terminals of each of the auto-transformers connected across all the turns are connected to coupling capacitors located inside the oil-filled body. The terminals of one auto-transformer connected across part of the turns is connectable to the high frequency leads of the transmission line, which also carries high voltage phase cables, while the terminals of the other auto-transformer connected across part of the turns is connectable to a user device.

14 Claims, 2 Drawing Figures

COUPLING UNIT TO COUPLE CARRIER FREQUENCIES FROM HIGH VOLTAGE TRANSMISSION LINES

BACKGROUND OF THE INVENTION

The present invention relates to coupling units, and particularly to a coupling unit which couples carrier frequency signals to a user device from a transmission line which carries both the high frequency signals as well as high-voltage signals.

It is already known to utilize high-voltage overhead or open lines for the transmission of communications. In arrangements of this type, the high voltage phase cables are frequently arranged to surround the high-frequency or carrier frequency conductor leads so as to shield the latter from external stray fields. In signal transmission of this type, the transmission and reception of the high frequency carrier signals must be carried out in a way which does not endanger the personnel which utilizes the user devices which receive the high frequency carrier signals. Thus, it is known that voltage breakdown, Corona and short circuits, for example, each may result in high voltages, present on the phase cables, to appear on the high frequency conductors.

Several known attempts at solving this problem have been made. Generally, the approach has been to provide coupling capacitors which have high voltage ratings so as not to break down upon the application of high voltages thereto, between the transmission cables and the user devices. Coupling capacitors serve, on the one hand, to block the high voltages from being applied to the user devices to thereby make the same safe against high-potential breakdown, and on the other hand, to permit the high frequency carrier signals to pass to the user devices.

Transmission cables of the type contemplated to be used in conjunction with the present invention have already been disclosed in German Pat. application No. P 2011016.1. In the latter application, the strands or the conductors for the high frequency communication signals are surrounded by a plurality of phase cables. Either two or four high frequency cables can be used. In both cases, the cables are positioned symmetrically in relation to the phase cables to provide operating symmetry.

The known coupling arrangements, when utilized in conjunction with cables of the type contemplated in the German patent application, have disadvantages in that they do not provide certainty or safety to the operating personnel as well as the connected user devices against high voltage breakdown, and they do not provide quality or efficient coupling of carrier frequency signals from the overhead cables to the user devices. Thus, the known coupling units do not exhibit optimum power transfer of the carrier frequency signals to these apparatus, and additionally do not provide the safety to the user of the devices to the extent required or desirable.

SUMMARY OF THE INVENTION

Accordingly, it is an object of the present invention to provide a coupling unit which can couple high frequency carrier signals from a transmission cable, which carries the latter as well as high voltage, to a user device and which assures optimum safety to the personnel making use of the device.

It is another object of the present invention to provide a coupling unit which is simple in construction and economical to manufacture.

It is still another object of the present invention to provide a coupling unit of the type under discussion which does not have the disadvantages associated with prior art coupling units, which provides optimum safety to the operating personnel, as well as high operating efficiency.

It is a further object of the present invention to provide a coupling unit which is flexible and readily adaptable to different transmission cables having different characteristic impedances, as well as to different user devices having different characteristic impedances.

It is still a further object of the present invention to provide a coupling unit which is useful in connection with overhead or open transmission lines and which can easily be equalized to obtain a good symmetry to ground.

With the above objects in view, the coupling unit in accordance with the present invention, is one for coupling carrier frequency from a transmission cable carrying both the carrier frequency and high voltages on first and second conductor means respectively, to a user device. The actual coupling unit comprises an elongated hollow insulating body having opposite ends. Capacitor means are provided interiorly of said insulating body. First input matching means are provided which are adapted to be connected to the first conductor means and positioned in the region of one of said opposite ends for matching the first conductor characteristic impedance to the impedance of said capacitor means. Second matching means are provided which are connectable to the user device and positioned in the region of the other of said opposite ends for matching the impedance of the user device with the impedance of the capacitor means. Also, said capacitor means is connected between the first and second matching means, the capacitance of said capacitor means being selected so that the coupling unit passes the carrier frequency to the user device but blocks the high voltages from being transmitted to the user device.

In accordance with the presently preferred embodiment, said elongated hollow insulating body comprises a hollow oil-filled body, said coupling capacitor means being enclosed within said body. In this connection, first and second metal caps are provided, said first metal cap enclosing one of said opposite ends and said first matching means, and said second metal cap enclosing the other of said opposite ends and said second matching means. Such second conductor means may, if desired, be connected to said first metal cap. In the latter case, and wherein said first matching means comprises a matching transformer having a center tap, said center tap can be connected to such first metal cap. Also, said second metal cap can be connected to the circuit ground. Further, said second matching means can comprise a matching transformer having a center tap, said center tap being connected to said second metal cap.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
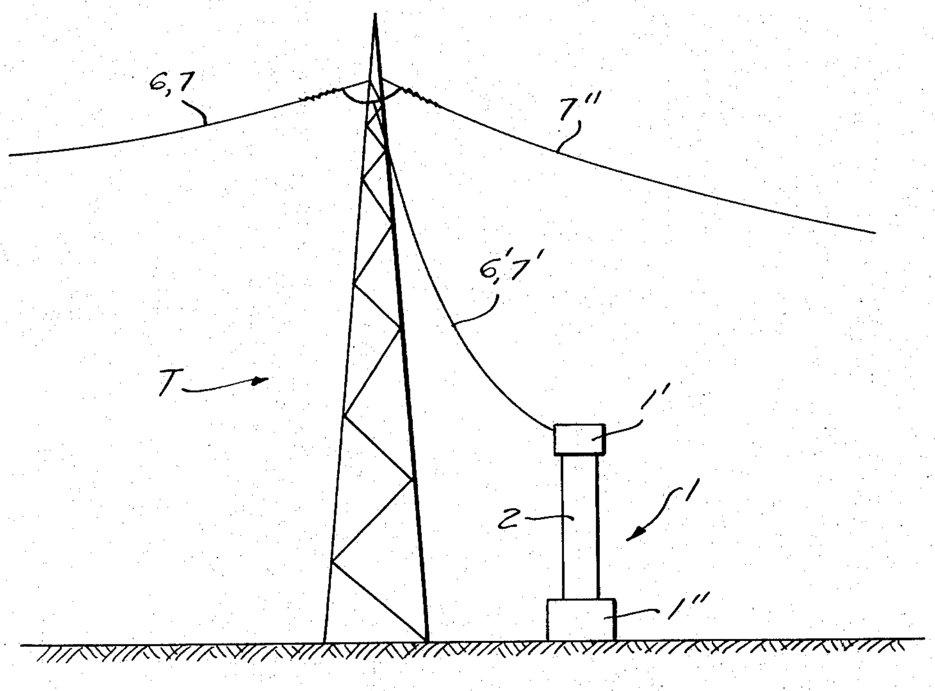
FIG. 1 is a side elevational view, in schematic, showing an overhead or open line carrying tower and coupling unit in accordance with the present invention receiving a transmission cable carrying both high voltage as well as high frequency signals.

Referring now to the Figures, and particularly FIG. 1, the reference numeral T represents a tower for overhead or open lines. The reference numerals 6, 7 represent a transmission cable which includes high voltage phase cables 6 as well as high frequency carrier signal leads or cables. For a detailed description of the construction of such cables, see the above mentioned German application. At the top of the tower T, the transmission cable 6, 7 branches off into transmission cable 6′, 7′ and high voltage phase cable 7″. The transmission cable 6′, 7′ is brought down to the coupling unit 1, to be presently described, while the high voltage phase cable 7″ continues on to the next tower or user apparatus. The method of branching off of the cables at the top of the tower is well known and can be made in the form of a T-bridge connection.

In accordance with the present embodiment, the invention will be described with the cable arrangement shown, namely, that the transmission cable 6, 7 is brought to the tower, but only the high voltage phase cable 7″ continues beyond. Referring to FIG. 1, the coupling unit 1 consists of an elongated hollow insulating body 2, an upper metal cap 1′ and a lower metal cap 1″.

Figure 2:
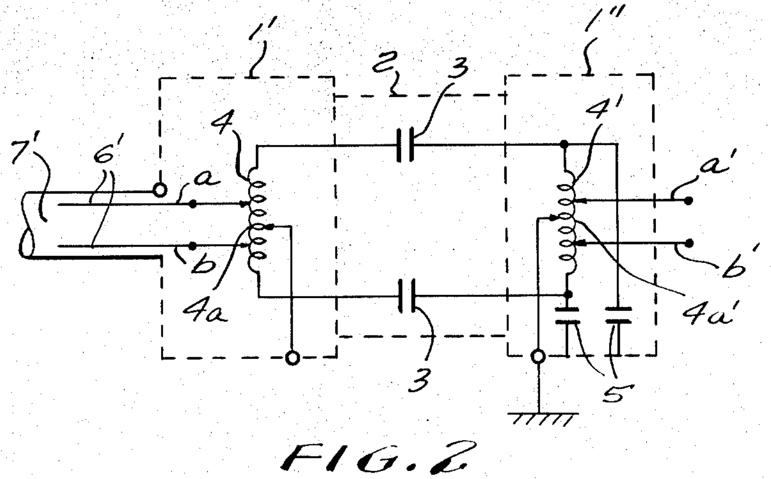
FIG. 2 is a schematic circuit of the coupling unit as shown in FIG. 1.

Referring now to FIG. 2, wherein the coupling unit 1 is shown in greater detail, the upper and lower metal caps 1′ and 1″, respectively, are shown by the dashed boxes. The hollow elongated body 2 is shown to extend between the two metal caps.

Enclosed within the upper metal cap 1′, there is provided an input matching transformer 4, which is in the form of an auto-transformer. The nature of the particular transformer is not critical for the purposes of this invention for reasons to be presently described. In the embodiment under discussion, the transmission cables 6′, 7′ include double leads or cables 6′ which carry the high frequency signals. The ends of the double leads which carry the high frequency signals are generally represented by the reference letters *a* and *b*. On the other hand, the external high voltage phase cables are shown to be connected, e.g. by soldering or welding, to the upper metal cap 1′. The input matching transformer 4 is provided with two end terminals as well as two intermediate terminals and a middle terminal or center tap 4*a*. The two end terminals of the input matching transformer 4 are connected to one set of terminals of the coupling capacitors 3, while the ends of the double leads *a*, *b* are connected to the intermediate terminals of the input matching transformer 4. The middle terminal 4*a* of the latter transformer is connected to the upper metal cap 1′and therefore, is also connected to the high voltage phase cables 7′, which are similarly connected to the upper metal cap 1′.

Similarly, at the other end of the hollow elongated insulated body 2, an output matching transformer 4′ is provided within the lower metal cap 1″. The output matching transformer 4′ is in the form of an auto-transformer similar to that of the transformer 4. Here, the end terminals of the output matching transformer 4′ are connected to the other set of terminals of the coupling capacitors 3, while the intermediate terminals of the output matching transformer 4′ are connectable to the user device, e.g. at the terminals *a*′, *b*′.

The lower cap 1″ is connected to the circuit ground. Additionally, each coupling capacitor 3 is connected to the circuit ground through equalizing capacitors 5 which serve to equalize the differences in capacitance of the coupling capacitors 3. As described above, the actual values of the various elements described are not critical to the present invention, it only being important that the coupling unit be capable of transmitting high enough frequencies which encompass the carrier frequency band of interest, while blocking the passage of frequencies which are low in nature and which are mostly associated with line frequencies of the power lines or high voltages.

While these values are not critical, the presently preferred embodiment involves the selection of matching transformers 4 and 4′ so that they transform the characteristic impedance of approximately 150 ohms to approximately 5,000 ohms. More particularly, referring to the matching transformers 4, 4′, the intermediate terminals of these transformers represent the low impedance terminals while the end terminals represent the high impedance terminals. Also, the capacitance of the coupling capacitors 3 are selected to be approximately 1,000 p.F. With the value of the coupling capacitors 3 being of this magnitude, the high impedance terminals of the matching transformers are connected to the coupling capacitors, while the input and output carrier frequency leads are connected to the lower 150 ohm terminals. With these selected values, the matching transformers cooperate with the coupling capacitors to provide a frequency band pass which can pass frequencies from approximately 20 kHz. to approximately 500 kHz. Frequencies outside of this range will be greatly attenuated. Since the typical frequency of the power line high voltage is 50 or 60 Hz., it is clear that the high voltage signals will be greatly attenuated by the coupling capacitors and virtually no voltage of the power line frequency will be transmitted into the output matching transformer 4′. However, because the coupling capacitors 3 must be able to block the passage of the very high voltage, low frequency current, it is necessary that these capacitors have a high voltage rating. However, because the capacitance required is relatively low, it is not difficult to provide such capacitors with high voltage ratings, and, in fact, such coupling devices for a high frequency tele-communication transmission systems on high voltage overhead lines are well known and readily available. For example, isolating bodies which are oil filled are commonly used for this purpose.

Because the elongated hollow insulating bodies 2 are typically 2 meters in length, the distributed capacitance of these individual capacitors to ground may vary slightly from each other. For this reason, the equalizing capacitors 5 are provided. The equalizing capacitors 5 have their values chosen to equalize the capacitance of both capacitors 3 to ground. To determine the values of the equalizing capacitors 5, each of the coupling capacitors 3 may be disconnected from the corresponding matching transformers 4 and 4', and the capacitors are measured individually with respect to ground, the values of the equalizing capacitors 5 being selected to equalize the capacitance of each of the capacitors 3 to ground.

As referred to above, the construction of the transmission cable 6, 7 is such that the phase cables 7 are arranged to surround the carrier frequency conductors which are held within the space formed by the phase cables whereby the phase cables shield the carrier frequency signal cables against external fields both in the transmission cable 6, 7 as well as in the transmission cable 6', 7'.

In this connection, the metal caps 1', 1'' serve to shield the ends of the hollow insulating body, particularly to enclose the ends of the double leads *a, b*, as well as the associated connections.

It should be noted that while the invention has been described in connection with two double leads for carrier frequencies, the present invention is equally applicable where more than two leads are provided. In this case, however, the number of coupling capacitors 3, must be selected to be equal to the number of carrier frequency leads.

Such a construction as described above fills all the requirements of such a coupling unit. First, it fulfills all the mechanical and electrical requirements. Second, such a coupling unit assures the safety of the users of the devices coupled to the coupling unit.

As described above, the high voltage phase cables 7 are connected to the cap 1', while the center tap 4*a* of the input transformer 4 is likewise connected to the upper metal cap 1'. In addition to bringing the potential of the double lead for the carrier frequency 6' to the same potential as the high voltage phase cables 7', to thereby prevent breakdown between these coaxial cables, the metal cap 1' so connected also serves the function of shielding the input matching transformer from external fields. Because the matching transformers are normally of the coil auto-transformer type, these transformers would normally be susceptable to pick up stray fields and have voltages induced therein which would interfere with the communication signals being transmitted on the double leads 6 for the carrier frequency.

In the same manner, by grounding the lower metal cap 1'', this metal cap provides good shielding to the output matching transformer 4' and prevents the latter from picking up the stray signals and transmitting them to the output leads *a', b'*.

With respect to both the matching transformers 4 and 4', the inductance of the coils is so selected that they present low impedance to current flow only at relatively low frequencies, but presenting the matching impedances described above only in the band pass frequency. Thus, because the frequency of the high voltages is substantially lower than that of the carrier frequencies and because the high voltage frequency is outside of the band pass of the matching transformer 4, the latter presents substantially a short circuit to the high voltage signals and they appear on the double leads 6'. However, at the carrier frequency, a matching transformer presents the characteristic matching impedances described above. Similarly, the center tap 4*a'* of the output matching transformer 4' is grounded. However, since only the carrier frequencies are present on the right hand side of the coupling capacitors 3, as seen in FIG. 2, the output leads *a', b'* are not at the ground potential.

Here again, at the carrier frequency, the output matching transformer 4' acts as a high impedance device which can match the characteristic impedances as described above.

Although the invention has been described in terms of matching a pair of double leads *a, b* which carry the high frequencies, a star-quad arrangement of high frequency leads can also be coupled with the present invention. Such a cable is described in the above German patent application. Such a star-quad generally consists of four symmetrically positioned cables which lie on the vertices of an imaginary square, all four leads being enclosed within a plurality of cables which surrounds the internal high frequency cables and act as a shield therefor. When the internal high frequency cables are not arranged in a perfectly symmetrical fashion, there arise imbalances due to the distributed capacitances between the internal cables as well as between the internal cables and the external cables. These imbalances usually result in cross-talk and must be balanced out, as for example, by the utilization of equalizing capacitors.

Because of the high voltages which are applied across the coupling capacitor 3, there will generally flow a very low current from the left-hand side of the coupling capacitors 3, as seen in FIG. 2, to the right-hand side. Such a current will be in the order of 20 milliamps. Because the frequency of such a leakage current is the same low frequency as that of the high voltage signals, these currents can flow through the output matching transformer 4' through the center tap 4*a'* to the ground. As described above, the impedance of the output matching transformer 4' is very low at these high voltage frequencies, since it usually consists of a low DC resistance coil. This leakage current which flows through the output matching transformer 4' to ground does not in any way adversely affect the operation of the coupling device.

The above description has been made for a single phase system. However, it is contemplated that the invention can be used in conjunction with three-phase or multiphase systems, in which case a separate coupling unit may be utilized for each phase. For example, with a typical three-phase system, which has a neutral point, a typical voltage between two high voltage phase lines may be 110 kilovolts, while the voltage between one of the phase lines and the neutral point is 63.5 kilovolts. The reference to 20 milliamps leakage current above has been made in connection with high voltages of this order of magnitude, the leakage current being a function of these high voltages and changing therewith.

Although the band width of the coupling unit has been described to be from 20 kHz. to 500 kHz, it is clear that the high-frequency end of the passband is not as critical as the low frequency insofar as the prevention of high voltages appearing at the user device. For this reason, the primary consideration is the selection of the coupling capacitors 3 to insure that the low frequency cutoff point of the coupling unit is sufficiently high above the high voltage frequencies to prevent the passage of the latter. Of course, the matching transformers 4, 4' must be selected to provide optimum matching between the input and output high frequency leads for optimum power transfer and also be selected to provide the minimum loss to the high frequencies.

It will be understood that each of the elements described above, or two or more together, may also find a useful application in other types of coupling devices differing from the types described above.

While the invention has been illustrated and described as embodied in a coupling unit to couple carry frequencies from high voltage transmission lines, it is not intended to be limited to the details shown, since various modifications and structural changes may be made without departing in any way from the spirit of the present invention.

Without further analysis, the foregoing will so fully reveal the gist of the present invention that others can by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A coupling unit for coupling carrier frequencies from a transmission cable carrying the carrier frequencies and high voltages on respective first and second conductor means to a user device, said coupling unit comprising an elongated hollow oil-filled insulating body having opposite ends; coupling capacitor means in the interior of said insulating body; first input matching means adapted to be connected to the first conductor means and positioned in the region of one of said opposite ends for matching the characteristic impedance of the first conductor means with the impedance of said capacitor means; second matching means connectable to the user device and positioned in the region of the other of said opposite ends for matching the characteristic impedance of the user device with the impedance of said capacitor means, said capacitor means being connected between said first and second matching means and being operative for passing the carrier frequencies to the user device while blocking transmission to the user device of the high voltages; and further comprising first and second metal caps, said first metal cap enclosing one of said opposite ends and said first matching means and being electrically connected to the second conducting means, and said second metal cap enclosing the other of said opposite ends and said second matching means, and wherein said first matching means comprises a matching transformer having a center tap connected to said first metal cap.

2. Coupling unit as defined in claim 1, wherein said second metal cap is connected to the circuit ground.

3. Coupling unit as defined in claim 2, wherein said second matching means comprises a matching transformer having a center tap, said center tap being connected to said second metal cap.

4. Coupling unit as defined in claim 1, wherein said first conductor means comprises two leads and said coupling capacitor means comprises a separate coupling capacitor for each of the two leads.

5. Coupling unit as defined in claim 4, wherein each of the coupling capacitors has one terminal connected to said second matching means; and further comprising an equalizing capacitor between each of said coupling capacitor terminals and said second metal cap.

6. Coupling unit as defined in claim 1, wherein said first and second matching means comprise first and second auto-transformers each having first and second sets of terminals, said first set of terminals being connected across part of the auto-transformer windings and said second set of terminals being connected across all the auto-transformer windings, said first set of terminals of said first auto-transformer is connected to said first conductor means, said second set of terminals of said first auto-transformer is connected to said coupling capacitor means; said second set of terminals of said second auto-transformer is connected to said coupling capacitor means; and said first set of terminals of said second auto-transformer is connectable to the user device.

7. Coupling unit as defined in claim 6, wherein said second set of terminals are arranged to be connected to a characteristic impedance of approximately 5,000 ohms, and said first set of terminals are arranged to be connected to a characteristic impedance of approximately 150 ohms.

8. Coupling unit as defined in claim 7, wherein said coupling capacitors have a capacitance of approximately 1,000 pF.

9. A coupling unit for coupling carrier frequencies from a transmission cable carrying the carrier frequencies and high voltages on respective first and second conductor means to a user device, said coupling unit comprising an elongated hollow oil-filled insulating body having opposite ends; coupling capacitor means in the interior of said insulating body; first input matching means adapted to be connected to the first conductor means and positioned in the region of one of said opposite ends for matching the characteristic impedance of the first conductor means with the impedance of said capacitor means; second matching means connectable to the user device and positioned in the region of the other of said opposite ends for matching the characteristic impedance of the user device with the impedance of said capacitor means, said capacitor means being connected between said first and second matching means and being operative for passing the carrier frequencies to the user device while blocking transmission to the user device of the high voltages; and further comprising first and second metal caps, said first metal cap enclosing one of said opposite ends and said first matching means, and said second metal cap enclosing the other of said opposite ends and said second matching means and being electrically connected to the circuit ground, said second matching means comprising a matching transformer having a center tap electrically connected to said second metal cap.

10. Coupling unit as defined in claim 9, wherein said second conductor means is connected to said first metal cap.

11. Coupling unit as defined in claim 9, wherein said first matching means comprises a matching transformer having a center tap, said center tap being connected to said first metal cap.

12. A coupling unit for coupling carrier frequencies to a user device from a transmission cable carrying the carrier frequencies on first conductor means including at least two electrical conductors and carrying high voltages on second conductor means, said coupling unit comprising an elongated hollow insulating body having opposite ends; coupling capacitor means in the interior of said insulating body and including a separate coupling capacitor for each of said two electrical conductors; first input matching means adapted to be connected to the first conductor means and positioned in the region of one of said opposite ends for matching the characteristic impedance of the first conductor means with the impedance of said capacitor means; second matching means connected to one terminal of each of said coupling capacitors and connectable to the user device and positioned in the region of the other of said opposite ends for matching the characteristic impedance of the user device with the impedance of said capacitor means, said capacitor means being connected between said first and second matching means and being operative for passing the carrier frequencies to the user device while blocking transmission to the user device of the high voltages; and further including a pair of equalizing capacitors, each electrically connected between the other terminal of a respective one of said coupling capacitors and ground potential.

13. Coupling unit as defined in claim 12, wherein said elongated hollow insulating body comprises a hollow, oil-filled body.

14. Coupling unit as defined in claim 13, further comprising first and second metal caps, said first metal cap enclosing one of said opposite ends and said first matching means, and said second metal cap enclosing the other of said opposite ends and said second matching means.

* * * * *